(12) United States Patent
Oren et al.

(10) Patent No.: US 7,693,914 B2
(45) Date of Patent: Apr. 6, 2010

(54) SYSTEMS AND METHODS FOR THE PRODUCTION, MANAGEMENT, SYNDICATION AND DISTRIBUTION OF DIGITAL ASSETS THROUGH A NETWORK

(76) Inventors: Shachar Oren, 3852 Commander Dr., Atlanta, GA (US) 30341; Peter Jennings, 17 Spence Ave., NE., Atlanta, GA (US) 30317

( * ) Notice: Subject to any disclaimer, the term of this patent is extended or adjusted under 35 U.S.C. 154(b) by 742 days.

(21) Appl. No.: 10/435,570

(22) Filed: May 9, 2003

(65) Prior Publication Data

US 2003/0236886 A1 Dec. 25, 2003

Related U.S. Application Data

(60) Provisional application No. 60/379,661, filed on May 9, 2002.

(51) Int. Cl.
G06F 17/30 (2006.01)

(52) U.S. Cl. ............ 707/795; 707/796; 705/14.1; 705/26

(58) Field of Classification Search ............ 707/1, 707/3, 9–10, 100, 102–104.1, 200; 715/700, 715/716, 723; 725/1, 8, 37, 61, 86, 105, 725/131; 705/14, 26, 1, 27, 50–52, 57–59; 709/200–203, 217–219, 223–225

See application file for complete search history.

(56) References Cited

U.S. PATENT DOCUMENTS

| | | | |
|---|---|---|---|
| 5,715,403 A | 2/1998 | Stefik | |
| 5,806,071 A * | 9/1998 | Balderrama et al. | 707/104.1 |
| 5,892,535 A | 4/1999 | Allen et al. | |
| 5,893,110 A * | 4/1999 | Weber et al. | 707/104.1 |
| 5,920,700 A | 7/1999 | Gordon et al. | |
| 6,389,541 B1 | 5/2002 | Patterson | |
| 6,477,508 B1 * | 11/2002 | Lazar et al. | 705/26 |
| 6,502,102 B1 * | 12/2002 | Haswell et al. | 707/102 |
| 6,665,797 B1 | 12/2003 | Keung | |
| 6,684,248 B1 | 1/2004 | Janacek et al. | |
| 6,751,670 B1 | 6/2004 | Patterson | |
| 6,799,165 B1 | 9/2004 | Boesjes | |
| 6,824,051 B2 | 11/2004 | Reddy et al. | |
| 6,925,469 B2 * | 8/2005 | Headings et al. | 707/102 |
| 6,947,959 B1 * | 9/2005 | Gill | 715/501.1 |
| 7,043,051 B2 * | 5/2006 | Kuzmich et al. | 382/100 |
| 7,089,309 B2 * | 8/2006 | Ramaley et al. | 709/226 |
| 7,110,984 B1 * | 9/2006 | Spagna et al. | 705/57 |
| 7,209,892 B1 * | 4/2007 | Galuten et al. | 705/26 |
| 7,346,687 B2 * | 3/2008 | Lipscomb et al. | 709/226 |
| 7,469,230 B2 * | 12/2008 | Vaidyanathan et al. | 705/53 |
| 2002/0026581 A1 * | 2/2002 | Matsuyama et al. | 705/51 |
| 2002/0083006 A1 * | 6/2002 | Headings et al. | 705/59 |
| 2002/0138619 A1 | 9/2002 | Ramaley et al. | |
| 2003/0083948 A1 * | 5/2003 | Rodriguez et al. | 705/26 |
| 2004/0193902 A1 | 9/2004 | Vogler et al. | |
| 2006/0173761 A1 * | 8/2006 | Costakis | 705/35 |
| 2006/0190290 A1 * | 8/2006 | Gomez | 705/1 |

* cited by examiner

*Primary Examiner*—Debbie Le
(74) *Attorney, Agent, or Firm*—Goldman IP Law

(57) ABSTRACT

Systems and methods are for production, management, syndication and distribution of digital assets through a network such as the Internet or wireless network. Digital media assets are distributed to consumers through a syndicated network of Outlets under control of a central platform. Distribution is format agnostic.

7 Claims, 9 Drawing Sheets

SYSTEMS AND METHODS FOR THE PRODUCTION, MANAGEMENT, SYNDICATION AND DISTRIBUTION OF DIGITAL ASSETS THROUGH A NETWORK

CROSS-REFERENCE TO RELATED APPLICATION

This application claims the benefit under 35 U.S.C. §119 (e) of U.S. Provisional Application No. 60/379,661 filed on May 9, 2002 and entitled "SYSTEMS AND METHODS FOR THE PRODUCTION, MANAGEMENT, AND DISTRIBUTION OF DIGITAL ASSETS THROUGH A NETWORK," the subject matter of which is expressly incorporated by reference herein.

FIELD OF THE INVENTION

The invention generally relates to the field of production, management, syndication and distribution of digital assets, and more particularly to systems and methods for the production, management, syndication and distribution of digital assets through a network of outlets which further distribute the assets to consumers.

BACKGROUND

A digital file is an electronically formatted file that contains digital data. One type of digital file is referred to as a digital asset. A digital asset is an electronic file containing digital data such as audio, video, audio-video, multimedia, music, graphics, or any other type of media-related content. Digital assets may be stored in a variety of electronic formats. For example, an audio or music file can be stored as a WAV or a WMA-type format. As another example, a digital asset can be a promotional file or a download that a recording company or musical group produces or creates.

Digital assets can be transmitted via a network such as the Internet or a wireless network. Typically, a content owner such as a recording company transmits a digital asset to another party in only a limited number of electronic formats, using more than one service provider or system which each may specialize in only one or a possible limited number of possible electronic format(s). To support and manage many or all of the potential electronic file formats in which a digital asset can be stored and transmitted, requires the content owner, or an associated host server or service provider, to possess a relatively large amount of processing and/or storage capacity, as well as proper management software logic and systems to handle the wide range of electronic file formats available. Typically, this amount of processing and/or storage capacity is very expensive and time consuming to maintain. Furthermore, the aggregation of all relevant skills and capabilities in one unified distribution system is non-existent. There exists a need for systems and methods for limiting the amount of processing and/or storage capacity needed for handling and distributing digital assets to consumers through the Internet or a wireless network. Furthermore, there exists a need for systems and methods for improving the operational efficiencies involved in the process of syndicating digital media assets to a distribution network and to end-users or consumers.

At least one system and method has been designed for controlling the use and distribution of digital works. However, this conventional system and method does not disclose how to handle a wide range of file formats available to network users. This conventional system and method lacks a database for metafiles in support of various digital works and in support of the association of such digital works with each other when the metafiles dictate such association or grouping. Therefore, a need exists for systems and methods for the handling and distribution of digital assets through a network such as the Internet or a wireless network in a wide range of electronic file formats.

While this conventional system and method may be able to control and distribute digital works in some file formats over a network, the files that are controlled and distributed by the invention are always related to a fee, a fee description, or an e-commerce transaction. A fee, fee description, or e-commerce transaction is not always required for handling and distribution of digital assets. Therefore, a need exists for systems and methods for handling and distribution of digital assets unrelated to a fee through a network such as the Internet or a wireless network.

The conventional systems and methods described above are limited to document publishing and digital rights management. Document publishing typically involves a printer or a printer module. The digital rights management relies primarily upon the consummation of an e-commerce transaction for digital works, specifically music or other electronic files that are purchased for or otherwise accessible after payment of a fee.

Moreover, these conventional systems and methods lack any efficient reporting feature or mechanism for providing reports. Although this system and method disclose a credit database, it lacks any reporting derived from a report database and metafiles in support of a syndicated digital work. Thus, using a conventional system and method, content providers would lack efficient management in the distribution of digital assets, and further lack focus in their marketing efforts for their digital assets. There exists a need for systems and methods for management and reporting in the distribution of digital assets through a network such as the Internet or wireless networks.

One present model for distribution of digital assets is that of the "digital service provider" ("DSP"). The focus of the DSPs is licensing and sub-licensing of digital content owned by the digital content owner(s). They license (and aggregate content or digital assets) from owner(s) of digital content and distribute this content by sale or license of the digital asset to end-user(s). This may be done, for example, by the licensing of individual digital item(s) or by means of subscription allowing the end-user(s) to have access to pre-determined digital content for a fixed period of time.

One of the methods by which this distribution is protected from being used without authorization is by encryption of the content. The user requires a "key" to decrypt the digital information and this "key" is provided to the user with the license.

This method of distribution works well for certain business purposes (e.g., generation of revenue from specific type(s) of digital content). However, since these DSPs are set up to distribute only specific type(s) of digital content form which they can derive licensing revenue, these DSPs may not be able to perform all of the business functions desired by the content owner(s).

For example, each piece of revenue-generating digital content (e.g., a particular track of audio) may be associated with numerous other digital material(s) in various formats, some of which may be helpful to the content owner in marketing and/or promoting the revenue-generating digital content.

For example, this promotional content may include videos, screen savers, material(s) relating to the artist(s) involved in the digital content, etc. It also may include right(s) to play revenue-generating content for a limited amount of time. The owner(s) of the digital content may wish to have this promotional distribution to be as wide-spread as possible without directly generating revenue(s) from such distribution. Present DSPs are ill-suited for performing this function. Their systems typically support only distribution of a limited number of type(s) of electronic files (e.g., audio or video in one or more selected formats).

Moreover, since their digital file distribution capabilities are limited, they are also limited in the amount of information they can collect and/or send back to the content owner relating to, for example, the demographics of the distribution of all of the digital content, including promotional content and not merely the revenue-producing content.

There is a need, therefore, for a system which can direct distribution of all digital content relating to a particular folder, or project, of the owner(s) of the digital content in a "format agnostic" manner (i.e., no format limitation(s)). There is also the need to have the capability to collect data regarding the demographics of the distribution of each of these type(s) of file(s) in a folder relating to a project on an individual basis.

Moreover, there is a need to collect all of these capabilities into one integrated system so that the owner(s) of the digital content can have one entity attend to its entire requirement for digital distribution and information collection relating to that distribution.

Another category of service providers offers asset distribution to a network of web sites. These service providers rarely offer the ability to customize the user experience involved in the delivery of media assets to end-users on a per-website basis for the distribution network members. Some service providers offer limited functionality related to this need. For example, they may allow a credit line and logo and some visuals related to each specific outlet to be shown in relation to the user experience. Such elements are normally featured within a pre-designed user interface environment.

There is a need, therefore, for a system and method that both allow member sites in the distribution network to control a variety of user interface elements pertaining to the assets they use via the service, as well as allow content owners similar controls over user interface element relevant to their asset(s).

In light of the above, there exists a need for systems and methods for the production, management, syndication and distribution of digital assets through a network such as the Internet or wireless networks.

SUMMARY OF THE INVENTION

The invention addresses the needs described above. The invention provides systems and methods for the production, management, and syndication of the distribution of digital assets through a network of Outlets via the Internet and/or a wireless network. The invention provides systems and methods for the handling and distribution of digital assets through a network such as the Internet or a wireless network in a wide range of electronic file formats. Furthermore, the invention provides systems and methods for the handling and distribution of digital assets unrelated to a fee through a network such as the Internet or a wireless network. Furthermore, the invention provides systems and methods for management and reporting in the distribution of digital assets through a network such as the Internet or wireless networks. Moreover, the invention provides systems and methods for the project-centric management of the syndication and distribution process for various media assets (free or for sale) in ways that address and compliment the business needs of both content owners and Outlets.

Generally described, the systems and methods according to a preferred embodiment of the invention are for the production, management, and syndication of the distribution of digital assets through a network of outlets via the Internet and/or wireless telecommunication networks. More specifically, the systems and methods according to a preferred embodiment of the invention are for the project-centric production, management, syndication and distribution of various assets to a distribution network in a customizable manner that is controlled in some respect by content owners and in some respect by Outlets.

The systems improve efficiencies in the operational processes of production, management, distribution, reporting and analysis of digital assets. Furthermore, the systems are "project-centric" and "format agnostic," and support a large variety of different types of digital assets. The systems provide publishing and distribution logic that provides the ability to download, stream, handle or otherwise accommodate digital asset on a project-centric basis, regardless of the type of asset. The system scan handle files for delivery via the Internet including, but not limited to, Microsoft WMA, Microsoft WMA streaming clips, WMV (video), RealAudio streams, RealVideo streams, e-cards, flash cards, screen savers, MP3, and/or other Internet delivery files. Furthermore, the systems can handle files for delivery via a telecommunications device communicating via a network such as a wireless network, including, but not limited to, VOX streams, MIDI ring tones, Java audio and video, Internet files, telecom-specific files, and wireless device specific files. This feature permits the systems to accommodate a variety of partner and client business models in support of both Internet delivery and telecommunication media asset delivery. Finally, the systems provide enhanced reporting capabilities on the usage of the digital assets handled by the invention.

More particularly described, the systems allow one or more owners or managers of a digital work to securely and efficiently distribute and administer the use of the digital work to multiple business partners (so-called Distribution Network, or Outlets) and ultimately to the consumers of such businesses, using computerized networks such as the Internet, a telecom network, a wireless network, or other similar systems.

Such administration includes (i) the posting of a digital work onto the distribution system, (ii) the entry of information related to the digital work in a fashion that is uniquely conducive for efficient administration of the digital work and its related data, (iii) the application of usage rights that are communicated to receiving Outlets and/or to consumers (some of which remain embedded within the uploaded digital work using digital rights management applications from third parties), (iv) the assignment of specific distribution avenues for the digital work, 0.0 whereby selected Outlets are chosen to receive the work throughout the distribution network, and whereby each outlet may have certain unique usage rules specific to the same digital work, and whereby the user interface for the delivery of the digital work to consumers may differ uniquely per Outlet, and (v) the monitoring of activity related to the digital work throughout the distribution life cycle and post end-date, and the generation of analysis data from the system that supports the business needs of the owner or manager of the digital work, as well as the business needs of the Outlets that are members of the distribution network.

The present invention features a computer system with an IP database which is updated on a regular basis. When a particular user accesses the system, the user's IP address can be read and a determination made as to what country the IP address is located based on the information stored in the database. To a lesser extent, the state and/or zip code of the user can also be derived from the IP address. This provides the system with a means for determining whether a territorial restriction is applicable to a particular customer.

The network and infrastructure of the present invention, rather than focusing on providing the most efficient form of distribution for a specific format of digital information is focused, instead, on the efficient management and delivery of all type(s) of information, whether it be in digital download format, stream format, or any other format.

The distribution of the multiple file(s) of each project may be handled through a syndication network of outlet(s) which, in turn, supply the file(s) to the end-user(s) in the outlet network. These outlet(s) may be a mix of outlet(s), none of which individually supports all of the media format(s) in the product package. For example, one group of outlets may handle distribution of digital downloads, whereas another outlet or outlets may be used for distribution of audio or video streams.

End-user information may be collected by means of "opt-in" survey(s). When accessing the survey(s), a small window is opened asking for the end-user(s)'s e-mail address. An option is given to the end-user to "opt-in" to the artist(s)'s mailing list, and/or the website's mailing list, and/or another "generic" mailing list. Birthday and other information may also be asked to supply a "generic" demographic record, which can be associated with future downloads to these specific consumer(s). This is valuable information for the content owner(s) in their marketing efforts. The survey(s) can be customized per asset and/or per Outlet.

In the case of encrypted assets, the opt-in survey(s) may be followed with a License Key template that includes the usage rules information and other field metadata. This template can also be customized per asset and/or per Outlet. When encrypted, assets expire (should the usage rules be set to do so), and an expiration notice is displayed for the end-user. This template can also be customized per asset and/or per Outlet.

Figure 1:
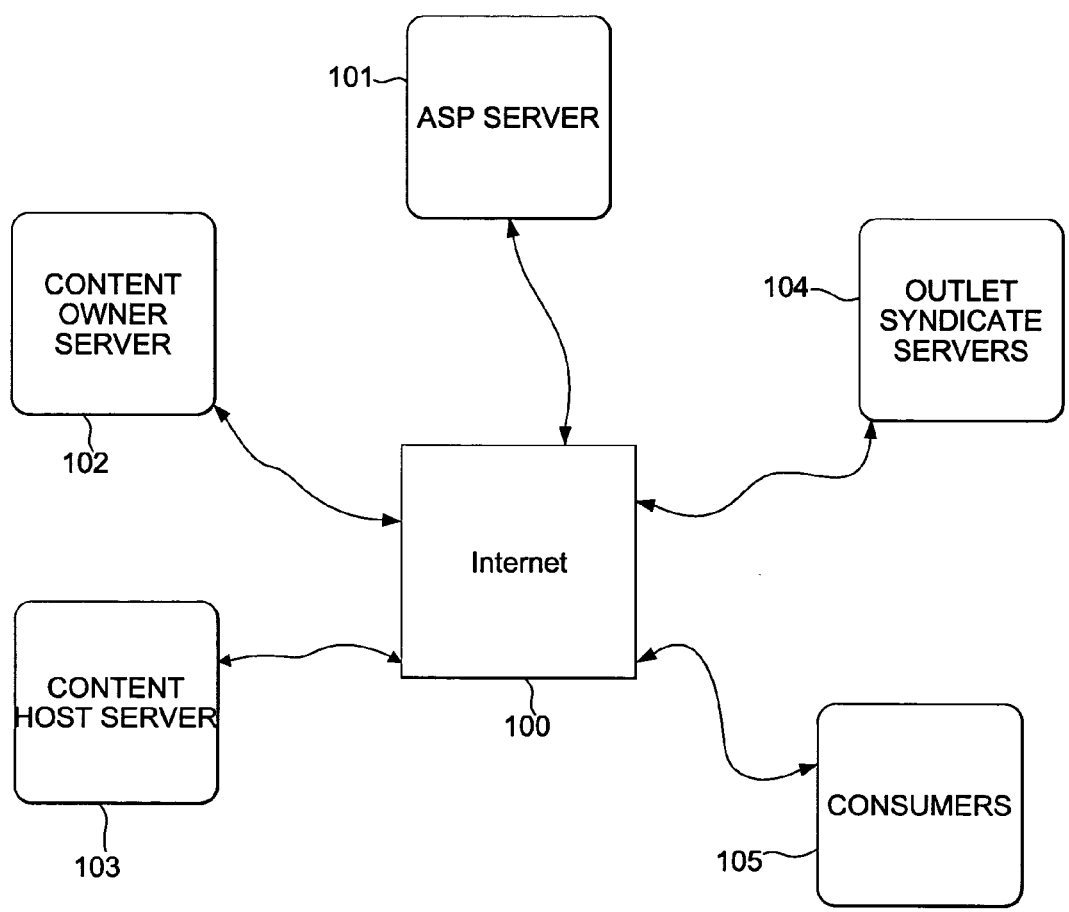
FIG. 1 is a block diagram of a computing environment in which the present invention functions according to one embodiment of the present invention.

Exhibit 1 is a description of an exemplary embodiment of a system and method in accordance with the invention.

Exhibit 2 is a description of an exemplary embodiment of a system and method in accordance with the invention.

Exhibit 3 is a description of an exemplary embodiment of a system and method in accordance with the invention.

Exhibit 4 is a description of an exemplary embodiment of a method in accordance with the invention.

DESCRIPTION OF DISCLOSED EMBODIMENTS

Systems and methods according to an embodiment of the invention provide for the production, management, syndication and distribution of digital assets through a network such as the Internet and/or a wireless network. The systems and methods for limiting the amount of processing and/or storage capacity needed for handling and distributing digital assets through the Internet or a wireless network. Further, the systems and methods are for the handling and distribution of digital assets through a network such as the Internet or a wireless network in a wide range of electronic file formats. Furthermore, the systems and methods are for the handling and distribution of digital assets unrelated to a fee through a network such as the Internet or a wireless network. Moreover, the systems and methods are for management and reporting in the distribution of digital assets through a network such as the Internet or wireless networks.

For example, the systems can be used to produce, manage, and distribute digital assets such as promotional files or downloads for a client record company to other media companies such as entertainment portals, retailers, or other related businesses. Furthermore, the systems can be used to provide Licensors and Distributors control over their digital assets and their distribution through a website interface. Finally, the systems can be used to permit Distributors to acquire their own promotional files or other digital assets from Licensors, and further prepare these assets for distribution to a consumer or end-user.

As described in this specification, a "Licensor" is an entity (also known as content owner) that provides new digital assets such as media files, downloads, and promotions. The Licensor can impose specific user limitations on the content of its digital assets such as the duration of play, number of plays, types of distribution, and quality.

As described in this specification, a "Distributor" can be an online store, online music outlet, a web portal, or another entity that distributes digital assets. A Distributor can also be known as an Outlet or a Channel Partner. Typically, a distributor can add a link to an associated website to permit a consumer to purchase products in conjunction with listening, viewing, or otherwise accessing another digital asset such as a promotional prior to purchase.

As described in this specification, an "Operator" is an entity that uses the website described in Exhibits 1-4.

As described in this specification, a "project" is a folder comprised of several, or multiple "digital works" or digital assets. A "project" is further described and illustrated by way of example in Exhibits 1-4.

Referring now to FIG. 1, there is illustrated an exemplary computing environment in which the present invention may be implemented. Generally described, the environment comprises a content owner server 102, which generally belongs to the entity which owns, or is the licensor, of the media asset to be distributed. It is possible, and even likely, that more than one content owner server 102 would be part of the system.

Content relating to content owned or controlled by the owner(s) or licensor(s) of content in the content owner server 102 may also be hosted in one or more content host servers 103. For example, promotional materials for a record album owned by the content owner may be hosted in the server of the service organization which produced this promotional material on behalf of the content owner.

Another server in the system is the server which hosts the software platform of the present invention. As illustrated in FIG. 1, this is an application service provider (ASP) server 101. The system also includes, preferably, a plurality of outlet syndicate server(s) 104. Finally, computer(s) 105 belonging to the consumer(s) to which the media asset(s) are intended to be distributed are a part of the system.

As illustrated by FIG. 1, all communications between the various elements of the system are described above may take place over the Internet 100. It will be appreciated, however, that any network capable of providing communication between these entities would be equally suitable. Moreover, although the platform which manages the distribution of media asset(s) in accordance with the present invention is shown by FIG. 1 as residing in an application service provider (ASP) server 101, the platform residing in any computing system appropriately linked to the remainder of the system element(s) would be equally useful.

Figure 2:
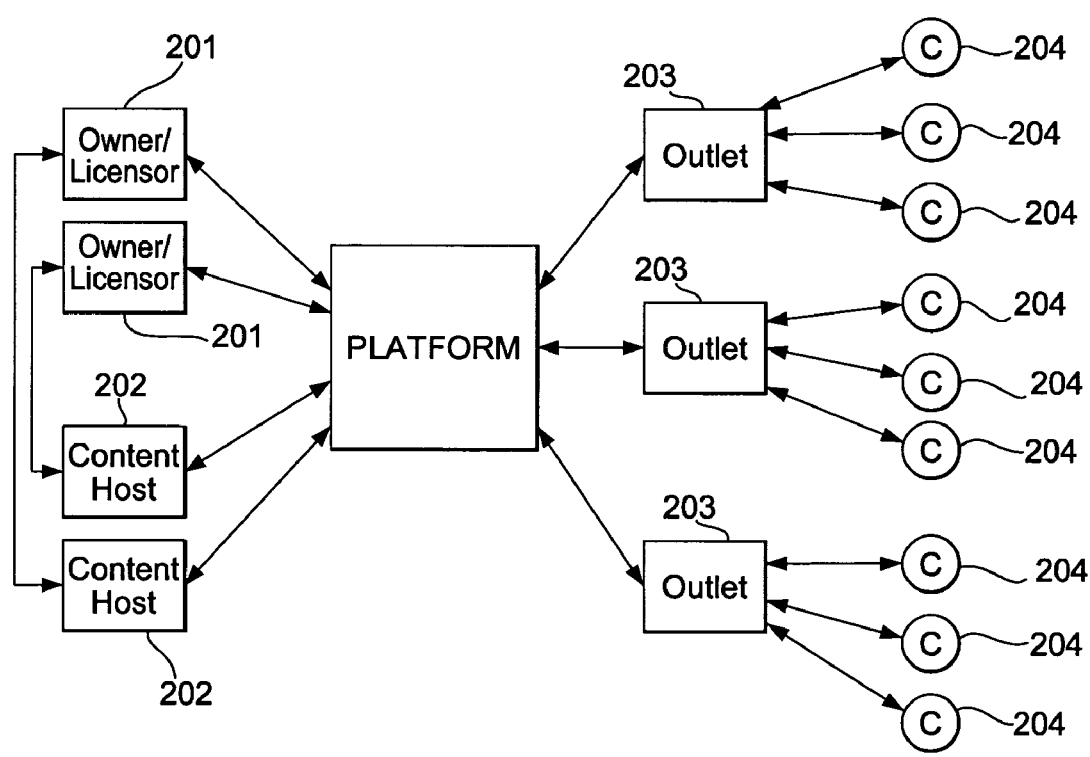
FIG. 2 is a dataflow diagram of a computing environment for syndicating the distribution of digital media through a network of outlets.

FIG. 2 is an illustrative computing architecture for the invention showing how communications between the various element(s) of the system of the invention are controlled. Central to this system is the platform 200 of the present invention, which manages all communications between the owner(s) and/or licensor(s) of the digital asset(s) 201 and their respective content host(s) 202, on the one hand, and a network of outlet(s) 203, which, in turn, are connected to network(s) containing a plurality of consumer(s) or end-user(s) 204.

As illustrated by FIG. 2, the respective owner(s) and/or licensor(s) of the digital asset(s) 201 may communicate with their content host(s) 202 directly for purposes not directly connected with this invention, e.g., communication(s) related to, for example, promotional material(s) developed by outside developer(s) who may also be the content host(s) 202.

Two-way communications may also take place between the owner(s) and/or licensor(s) of the digital asset(s) 201 and the platform 200, and/or between the content host(s) 202 and the platform 200. Two-way communication is also available between the platform 200 and the outlet(s) 203, and the platform 200 may communicate to consumer(s) via the outlet(s) 203.

It will be seen from FIG. 2 that distribution of media asset(s) originating at the owner(s) and/or licensor(s) of the digital asset(s) 201, and/or the content host(s) 202, may be distributed to consumer(s) or end-user(s) 204 via a syndication network 205 of outlet(s) 203.

The process for downloading digital media to consumer(s) will now be further explained with reference to FIG. 3A, FIG. 3B, and FIG. 3C.

Figure 3A:
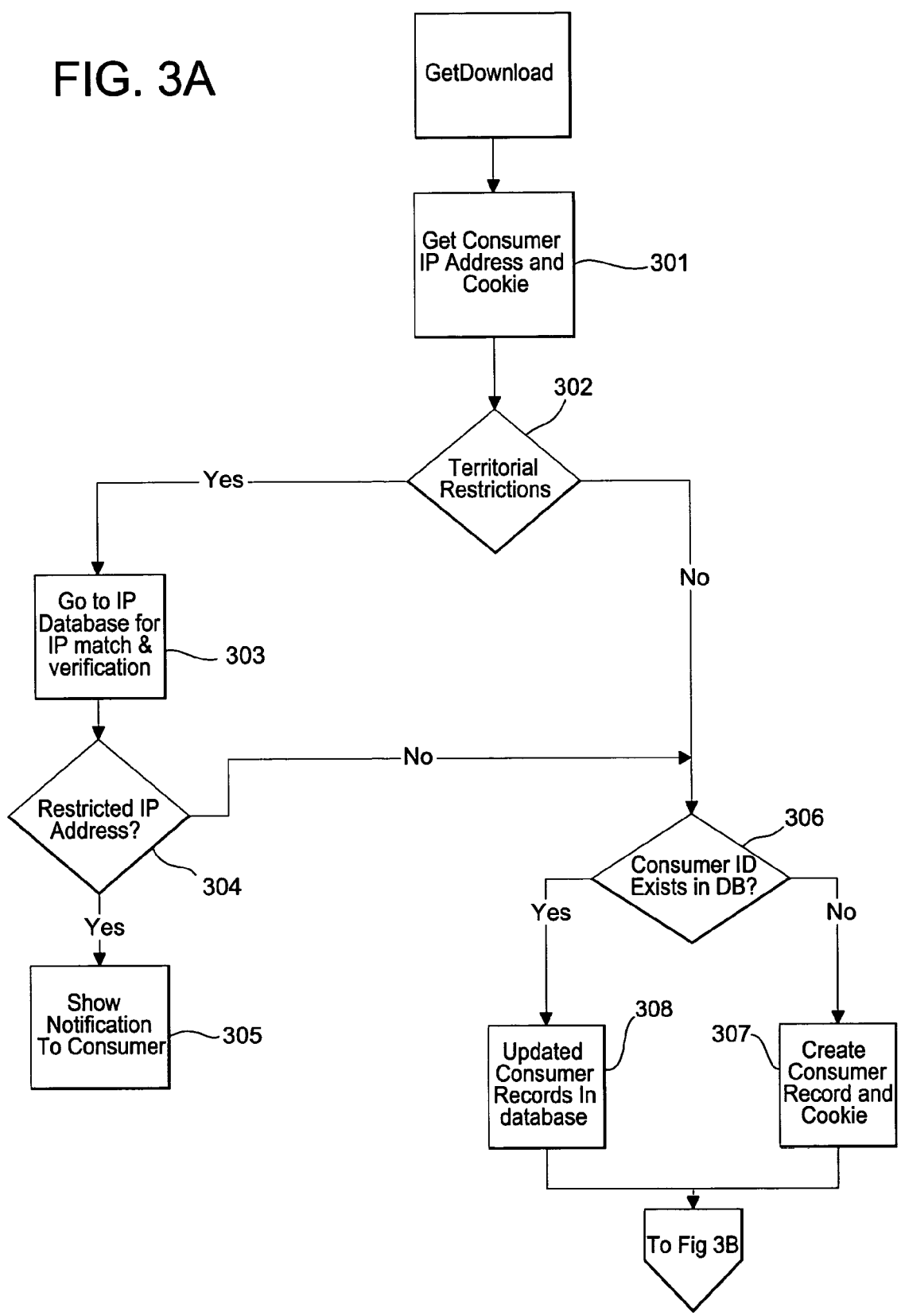
FIG. 3A, FIG. 3B and FIG. 3C are a flow diagram illustrating a method for getting a download of a digital asset for a customer via an outlet in a syndicated distribution system of the present invention.

Referring first to FIG. 3A, the process of downloading digital asset(s) to a consumer(s) or end-user(s) 204 begins when a consumer or end-user requests such a download through its media outlet(s) 203 (See FIG. 2).

The platform 200 first gets the Internet Protocol Address (IP address) of the consumer and the appropriate cookie in Block 301 of FIG. 3A. In Block 302 of FIG. 3A, a determination is then made as to whether there is a territorial restriction on the particular media asset(s). For example, the media owner(s) may desire that the particular asset be distributed in the United States but not in any of the countries of Europe or Asia. This information had been transmitted to the platform 200 by the media owner(s) or operator(s) earlier. If there is such a territorial restriction on the requested media asset(s), Block 303 of FIG. 3A is entered, and the platform 200 examines an IP database to match and verify the EP address of the consumer with previous information connected with the consumer having that IP address.

In Block 304 of FIG. 3A, a determination is made as to whether the IP address of the requesting consumer is a "restricted" one, that is, it is assigned to a geographical location other than the geographical location(s) in which the media owner(s) wishes distribution of the media asset(s) to take place in. If the IP address is, in fact, "restricted," the process goes to Block 305 of FIG. 3A, where a notification is sent to the consumer that the media asset(s) requested is unavailable in the consumer(s)'s geographical location of the particular consumer 204.

Returning to Block 302 of FIG. 3A, if no territorial restriction had been placed on the media asset(s) by the media owner(s), the program proceeds to Block 306 of FIG. 3A. Similarly, if the IP address of the consumer 204 was not a "restricted" one (as determined in Block 304 of FIG. 3A), the program also proceeds to Block 306 of FIG. 3A. In Block 306 of FIG. 3A, a determination is made as to whether record(s) of the consumer requesting the media asset(s) exists in the IP database. If it does, any necessary update(s) relating to the current transaction are made to the stored record(s) of the consumer, and the program proceeds to Block 309 of FIG. 3B. If, on the other hand, no record(s) of the particular consumer presently exist in the platform, a record of the consumer is made, and its cookie stored. The program then proceeds to Block 309 of FIG. 3B.

Figure 3B:
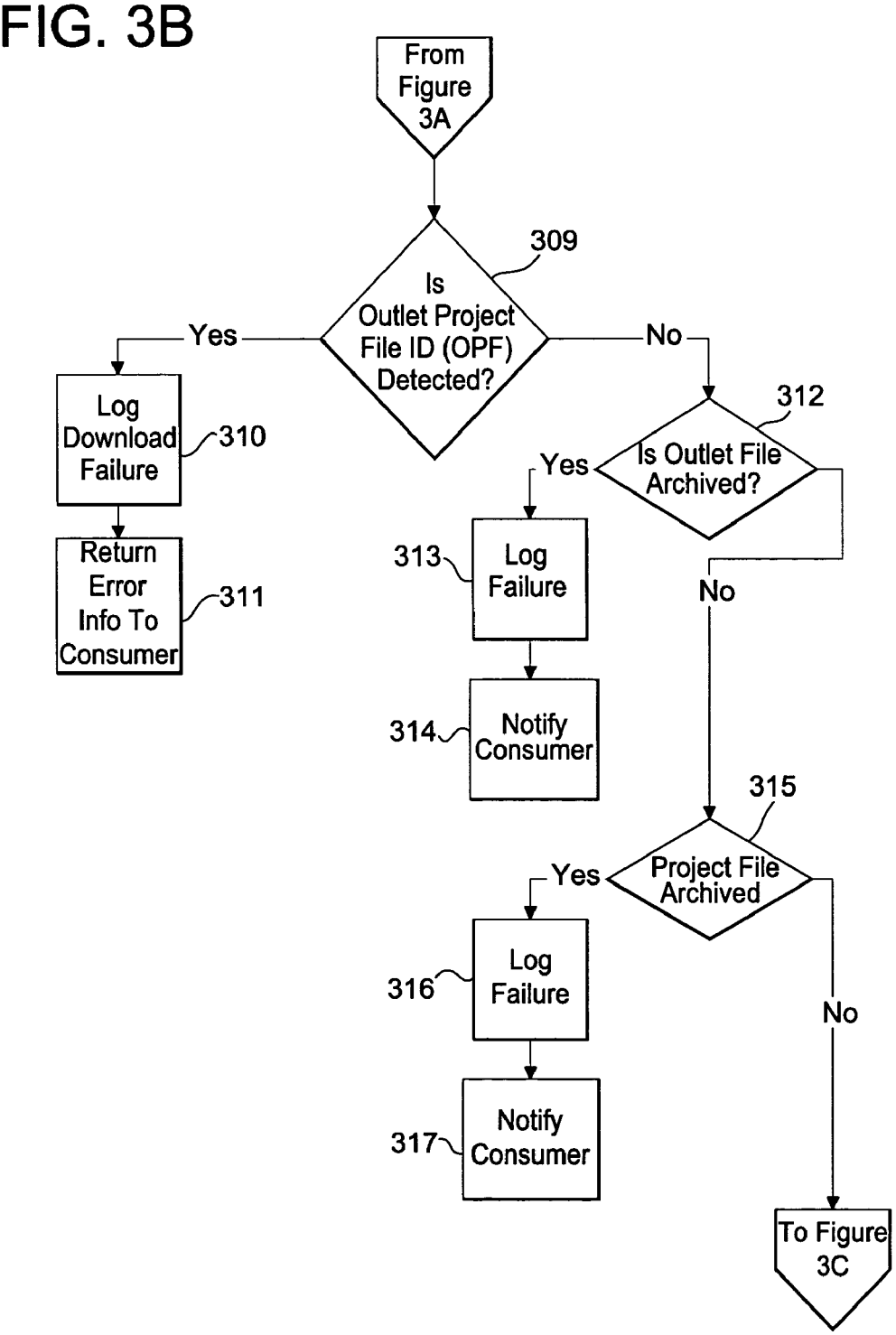

In Block 309 of FIG. 3B, a determination is made as to whether the project file(s) which contains the digital asset(s) requested by the consumer has been deleted. If the project file(s) which contains the digital asset requested by the consumer has been deleted, Block 311 of FIG. 3B is entered, where the occurrence of a download failure is logged into the system. In Block 311 of FIG. 3B, error information is returned to the consumer, indicating the failure of the download.

Returning to Block 309 of FIG. 3B, if the outlet project file has not been deleted, the program proceeds to Block 312 of FIG. 3B, where a determination is made as to whether the outlet project file has been archived (i.e., is no longer available actively on the system). This outlet project file contains information such as the user interface data (which is appropriate to the particular outlet servicing the consumer). If the outlet project file has been archived, failure of the download is logged in Block 313 of FIG. 3B and the consumer is notified of the failure of the download in Block 314 of FIG. 3B.

If the outlet project file has not been archived in Block 312 of FIG. 3B, Block 315 of FIG. 3B is entered, where a determination is made as to whether the appropriate outlet project file has been archived (i.e., is no longer available actively on the system). The outlet project file contains the media asset requested by the consumer. If the appropriate outlet project file has been archived (i.e., is no longer available actively on the system), a download failure is logged in Block 316 of FIG. 3B and the consumer is notified of the failure of the download in Block 317 of FIG. 3B.

Figure 3C:
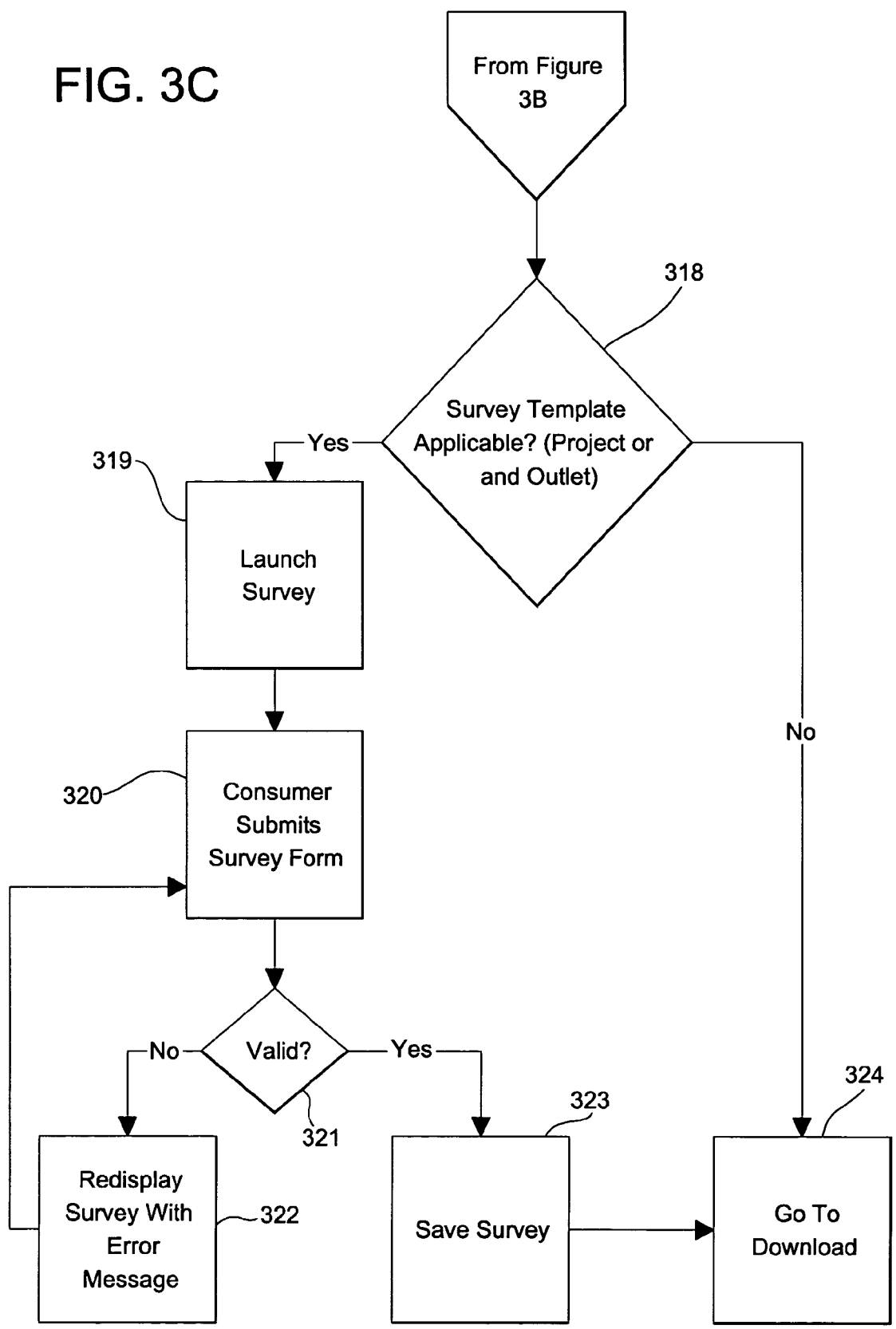

If the outlet project file has not been archived, the program proceeds to Block 318 of FIG. 3C, where a determination is made as to whether a survey template is applicable. Such a survey template may relate to a request for consumer information which is associated with either the particular project or the particular outlet servicing the consumer. If the survey template is applicable, the survey software is launched in Block 319 of FIG. 3C, and the consumer submits a survey form with the required information in Block 320 of FIG. 3C.

In Block 321 of FIG. 3C, a determination is made as to whether the consumer completed the survey form correctly (i.e., is the form "valid"). If the survey form is not "valid," Block 322 of FIG. 3C is entered, where the survey form is re-displayed to the consumer with an error message requesting correction, and the program returns to Block 320 of FIG. 3C, where the consumer re-submits the survey form.

When the survey form is validly submitted (valid information provided by the consumer) the data collected by the survey is saved in Block 323 of FIG. 3C, and the media asset requested by the consumer is downloaded to the consumer by the appropriate outlet using the user interface appropriate for that particular outlet.

Returning to Block 318 of FIG. 3C, if there is no survey template associated with a particular project and/or outlet being utilized, Block 324 of FIG. 3C is entered directly and the consumer gets the digital asset download from the appropriate outlet using the user interface appropriate for that particular outlet.

FIG. 4A, FIG. 4B, FIG. 4C and FIG. 4D relate to a situation in which the media asset requested by the consumer will be supplied in an encrypted form and/or the owner(s), or licensor (s), of the media asset(s) desires certain restriction(s) to be placed on the consumer's use of the particular media asset(s), such as a limit in use to a time period selected by the owner/licensor. This may be useful, for example, in a situation where a record company is promoting an album and wishes to download one or more tracks from the album on a "complimentary" basis to promote the album but wishes the license to expire after a fixed period of time (e.g., thirty (30) days). Additional usage rules are available within various DRM software for public relations as well as commercial usage and/or e-commerce purposes.

Figure 4A:
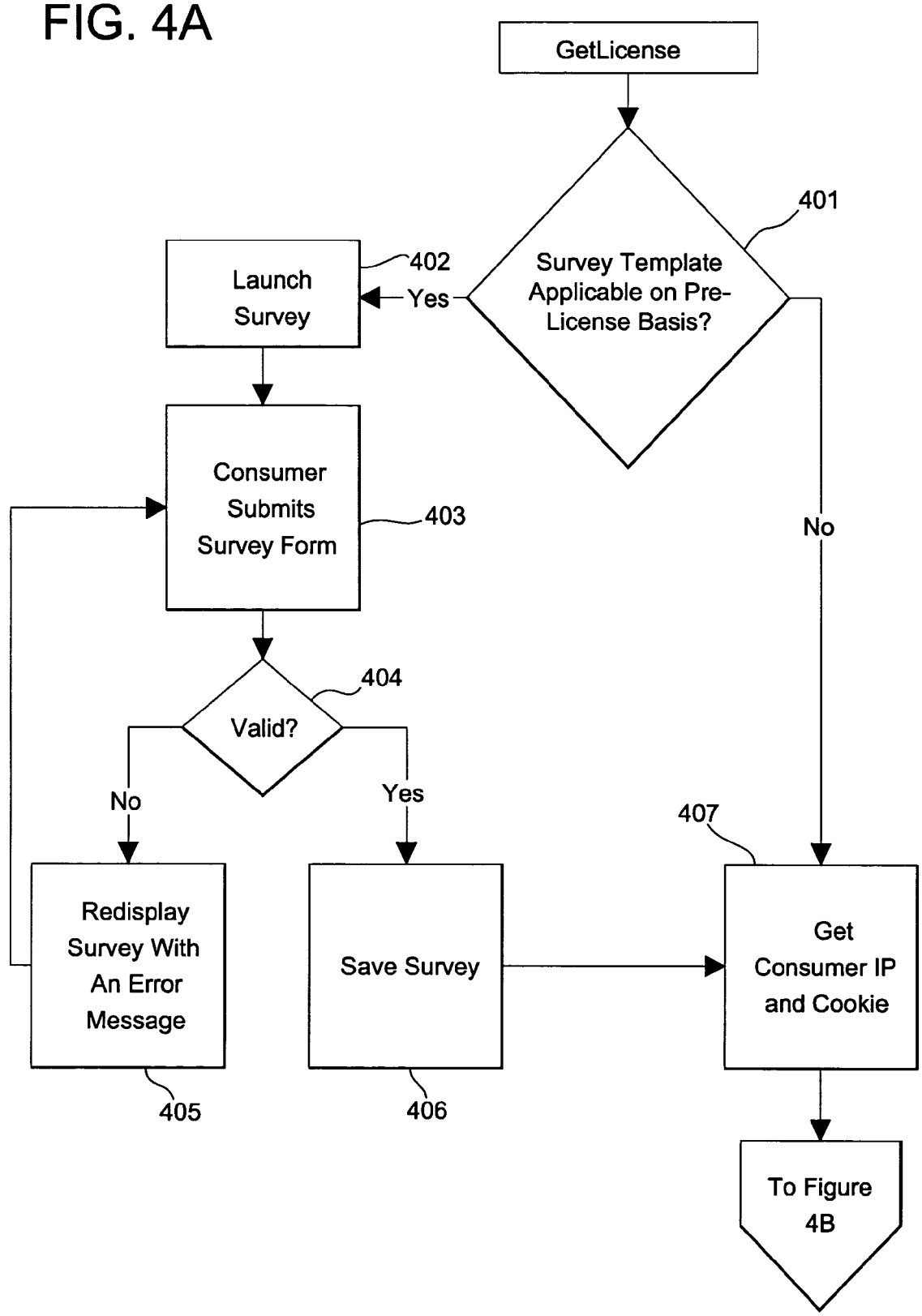
FIG. 4A, FIG. 4B, FIG. 4C and FIG. 4D are a flow diagram illustrating a method for getting a license for the usage of a digital asset via an outlet in a syndicated distribution system.

Referring to FIG. 4A, the licensing process begins at Block 401 of FIG. 4A, where a determination is made as to whether a survey template is applicable on a pre-license basis. That is, is the consumer required to complete a survey as a requirement for receiving the license. Such a survey may provide valuable demographic and/or marketing information to either the owner(s), or licensor(s), of the media asset(s), or to the outlet(s). Thus, the offering of a "free" license for a limited period of time may act as an incentive to the consumer to take the time to complete the requested survey.

If a survey is applicable, Block 402 of FIG. 4A is entered and the survey software is launched. In Block 403 of FIG. 4A, the consumer submits the survey form, and in Block 404 of FIG. 4A, the information supplied by the consumer is examined for validity. If mistake(s) have been made by the consumer, Block 405 of FIG. 4A is entered, where the survey is re-displayed to the consumer with an error message, and the program returns to Block 403 of FIG. 4A where the consumer re-submits the survey form.

If the survey information is "valid," the submitted information is saved in Block 406 of FIG. 4A and the platform gets the IP address of the consumer and the appropriate cookie in Block 407 of FIG. 4A.

Returning to Block 401 of FIG. 4A, if the survey template is not applicable on a pre-license basis, Block 407 of FIG. 4A is entered directly. From Block 407 of FIG. 4A, the program proceeds to Block 408 of FIG. 4B, where a determination is made as to whether there is a territorial restriction on distribution of the requested media asset(s). If there is a territorial restriction on distribution of the requested media asset(s), Block 409 of FIG. 4B is entered, and the IP database is examined for an IP address match and verification with the IP address supplied by the requesting consumer.

Figure 4B:
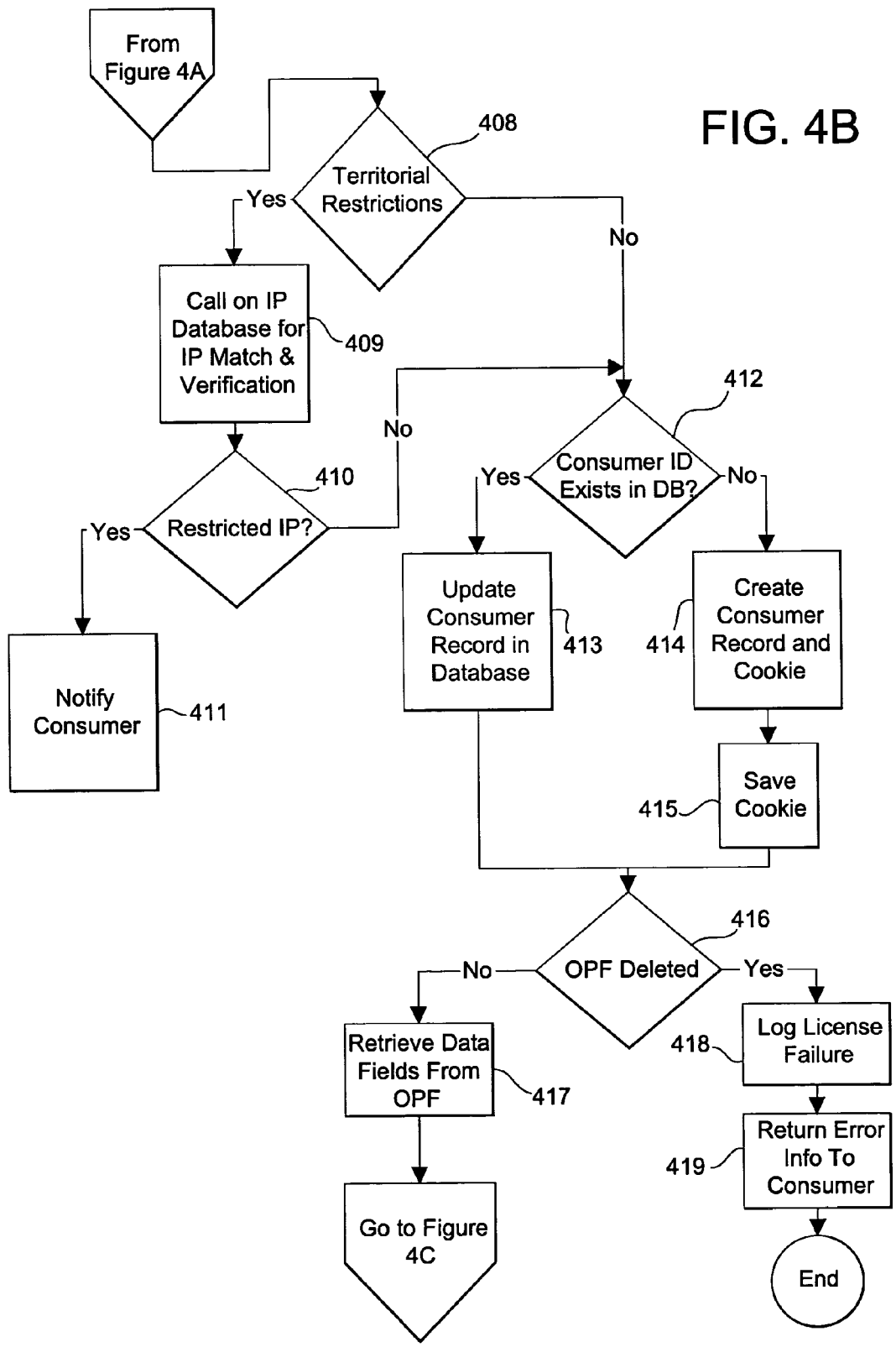

In Block 410 of FIG. 4B, a determination is made as to whether the IP address is restricted (i.e., the IP address is assigned to a territory other than the territory authorized for licensing by the owner(s), or licensor(s), of the media asset (s)). If the IP address is restricted, the consumer is so notified in Block 411 of FIG. 4B. If the IP address is not restricted, or if there is no territorial restriction (as determined in Block 408 of FIG. 4B), the program proceeds to Block 412 of FIG. 4B.

In Block 412 of FIG. 4B, a determination is made as to whether a record of the consumer exists in the platform. If such a record does exist, the record is updated with the saved data from the survey which the consumer may have just completed. If a consumer record does not exist, Block 414 of FIG. 4B is entered, and a record of the consumer is made, and then the appropriate cookie of the consumer is saved in Block 415 of FIG. 4B.

In either case, the nest step of the program is Block 416 of FIG. 4B, where a determination is made as to whether the outlet project file record has been deleted. The processes by which this file may be deleted, and the contents of the outlet project file are discussed in greater detail in Exhibits 1, 2 and 3 annexed hereto. If the outlet project file record has been deleted, a license failure is logged in Block 418 of FIG. 4B, and error information is returned to the consumer in Block 419 of FIG. 4B, and the licensing sequence is then terminated.

If the outlet project file record has not been deleted, the program goes to Block 417 of FIG. 4B, where data field(s) are retrieved from the outlet project file record. The program then proceeds to Block 420 of FIG. 4B, where a calculation is made as to the end date of the license, if any.

Next, in Block 421 of FIG. 4C, a determination is made as to whether the present date is later than the end date of the license period desired by the owner(s), or licensor(s), of the media asset(s). For example, the license may be offered for a fixed period of time prior to, or concurrent with, the release date of the album which the licensed digital asset is associated with. If the end date has been "passed," a failure is logged in Block 425 of FIG. 4C and the consumer is so notified in Block 426 of FIG. 4C.

Figure 4C:
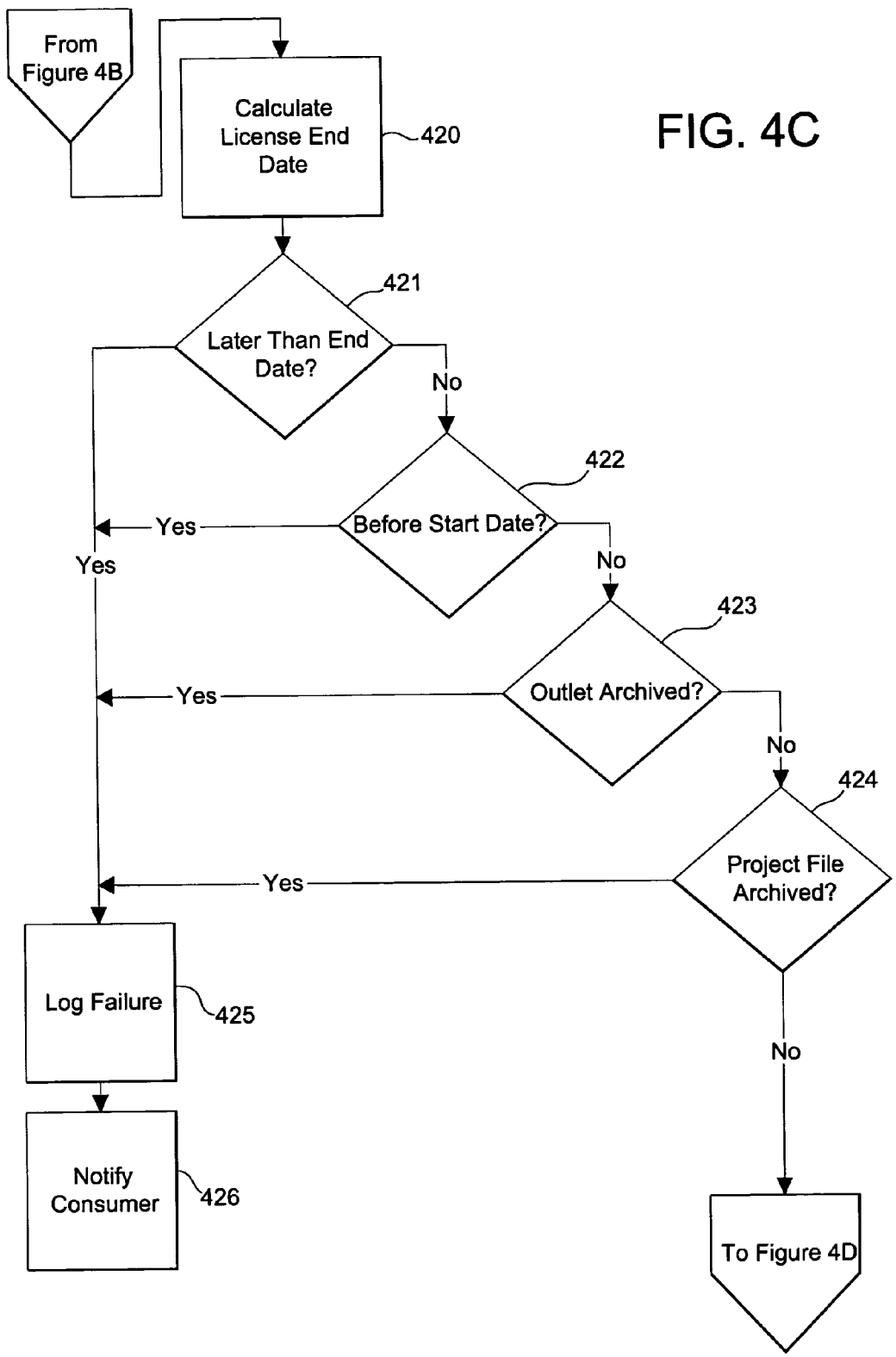

If the end date of the license has not already "passed," Block 422 of FIG. 4C is entered, where a determination is made as to whether the current date is prior to the start date of the license period determined by the owner, or licensor, of the digital media asset desired by the consumer.

If the present date is not prior to the start date of the license, Block 423 of FIG. 4C is entered, where a determination is made as to whether the outlet through which the consumer requested a license has been archived (i.e., is no longer active on the system). If the outlet project file has not been archived, Block 424 of FIG. 4C is entered, where a determination is made as to whether the outlet project file in which the desired media asset(s) exist has been archived (i.e., is no longer active on the system), and the program proceeds to Block 427 of FIG. 4D.

In the event that the current date is prior to the start date of the license of the digital media asset(s) requested by the consumer (as determined in Block 422 of FIG. 4C), and/or the outlet through which the license has been requested has been archived (as determined in Block 423 of FIG. 4C), and/or the outlet project file in which the digital media asset(s) exists has been archived (as determined in Block 424 of FIG. 4C), the appropriate failure of the licensing process is logged in Block 425 of FIG. 4C, and the consumer who had requested the license to utilize the digital media asset(s) is notified in Block 426 of FIG. 4C.

Figure 4D:
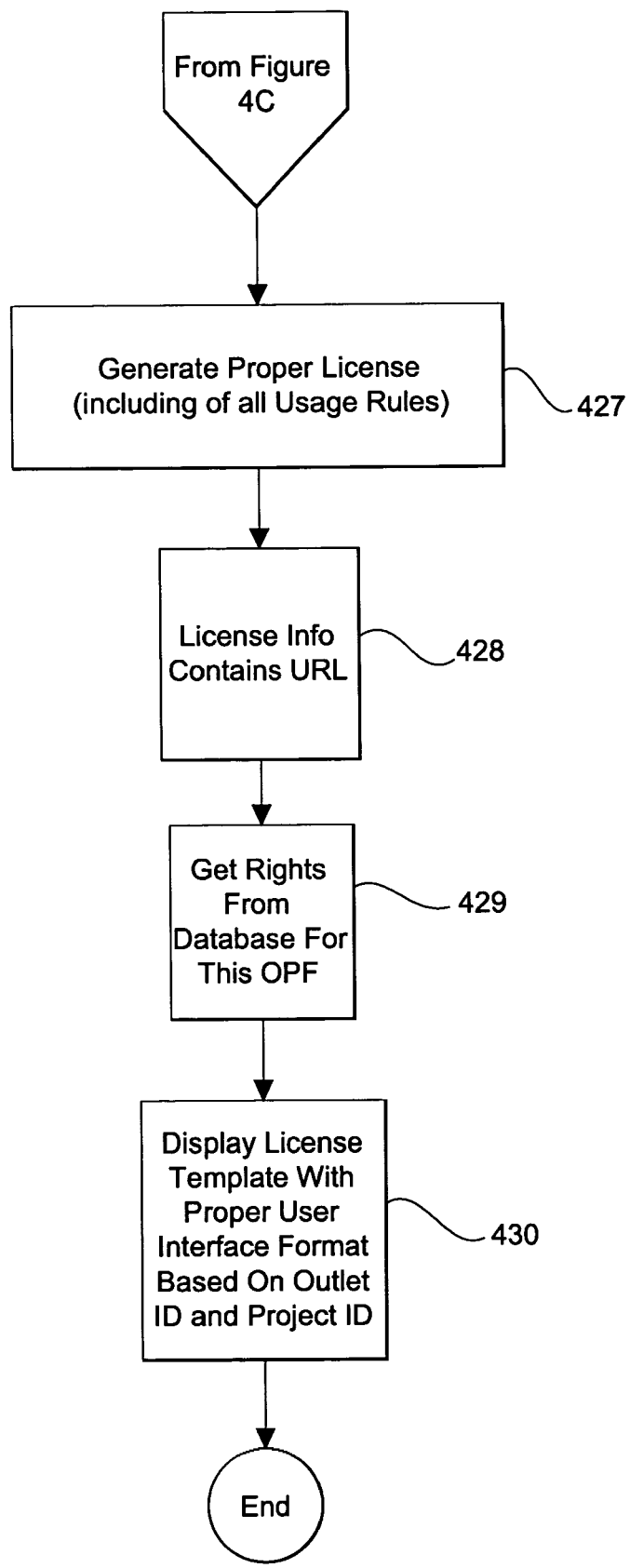

Referring to Block 427 of FIG. 4D, the proper license applicable to the consumer, outlet(s) and/or project(s) is generated. As indicated in Block 428 of FIG. 4D, the license information contains the URL of the requested digital media asset(s).

Next, in Block 429 of FIG. 4D, the appropriate right(s) are retrieved for the IP database for the particular outlet project file relating to the download requested by the consumer.

Finally, in Block 430 of FIG. 4D, the license template with the appropriate user interface format based on the outlet identification and the project identification is displayed to the consumer.

Exhibit 1 is a description of an exemplary embodiment of a system and method in accordance with the invention. Pages 1 through 45 of Exhibit 1 describe a series of screenshots associated with a website associated with the invention.

The systems and methods can be embodied in a website that operates via the Internet or another network such as a wireless network. The website executes on a processor-based platform, such as a Web server, that can be hosted by a system administrator or another administrative entity. The platform includes an enabling engine or production module, a front-end server, an administrative server, an encoder, a digital rights management module, a Windows Media server, a download manager module, a streaming manager module, a database, and a reporting or monitoring module. The platform can be configured with an enabling engine to facilitate the production, hosting, and delivering of digital assets in accordance with the invention. The platform is further configured for the production, administration, and monitoring of one or more online promotions for one or more partners so that the partners can expose and deliver digital assets or content to one or more end-users or consumers. Finally, the platform is configured for the generation of detailed reports on all activities involving the production, hosting, delivering of digital assets including the production, administration, and monitoring of one or more online promotions involving the digital assets. Each module of the platform is protected and ensures secure user access to each of the production, administration, and monitoring modules.

The database or administration module is configured to host digital assets such as media files, deliver digital assets, and manage licenses provided or the digital assets. For example, the database or administration module can provide a license and reporting only service, whereby a specific distributor can host particular digital assets on its own servers and deliver the files independently.

The enabling engine or production module includes functionality to control and monitor the bandwidth, download rate, and maximum volume caps for all, or a portion of, the digital assets that are managed by the invention. This functionality provides careful control of budgetary constraints that may be placed on an associated client and any related digital assets.

Other modules are described in Exhibit 3.

On Page 7 of Exhibit 1, an example of an exemplary process flow, or work-flow in accordance with an embodiment of the invention is illustrated. In a first block, the production function is shown. The first block is followed by a second block in which a hosting function is shown. The second block is followed by a third block, in which a distribution to outlets function is shown. The third block is followed by a fourth block in which consumer interaction function is shown. The fourth block is followed by a fifth block in which a reporting function is shown. The fifth block has a return branch that returns to the first and/or the third blocks.

On Pages 8-9 of Exhibit 1, a login web page is illustrated. For example, an operator can login to the platform and a main page is displayed to the operator on an associated display device. The operator can select one or more functions from the main page such as search projects, production, licensors management, outlets management, reports, customer service, administration, and logoff. Other functions may exist. Using an associated input device, the operator can select a function to proceed with.

Pages 9-20 of Exhibit 1 illustrate a set of production web pages. These web pages describe user options such as "Create New Project," "Create Incentive," "Create Mass E-mail Campaign," "Edit Project," "Q/A Files," and "Review Archives By." Other user options may exist.

Pages 20-24 of Exhibit 1 illustrate a set of licensors management web pages. These web pages permit an operator such as a record company, associated labels of the record company, publishers, performance rights associations, or other clients to manage licensor options. These options can include, but are not limited to, "Create Record Company/Studio," "Edit Record Company/Studio," Create Label Subgroup," "Edit Label Subgroup," "Create Label Operator," "Edit Label Operator," "Create Publisher," "Edit Publisher," "Create Performance Rights Association," and "Edit Performance Rights Association." Other options may exist. For example, a client may desire to define access rights for a particular entity to a particular digital asset, including a specific territorial coverage for the particular entity's right to a specific digital asset.

Pages 24-30 of Exhibit 1 illustrate a set of outlets management web pages. These web pages permit an operator to manage the outlets that may receive the digital asset by selecting particular outlet options. These options can include, but are not limited to, "Create New Outlet," "Edit Outlet," "Create Outlet Subgroup," "Edit Outlet Subgroup," "Edit Outlet Operator," "Manage Content For," and "Manage Content Order for ALL Outlets." Other options may exist. For example, an operator may want to define a particular set of content format access rights or a territorial association for a particular outlet.

Pages 30-32 of Exhibit 1I describe a set of report web pages. These web pages permit a user (an operator) to define and generate a particular report according to specific options. These options can include, but are not limited to, activity for a particular project, client, label, publisher, artist, performance right society, or channel outlet; a specific digital asset format; a territory; an outlet category; a type of analysis such as general or specific ratios between usage or by demographic information collected via a questionnaire; a time period; research parameters such as gender, zip code, age, country, specific questionnaire answers; sort type; and output type.

Page 32 of Exhibit 1 describes a set of customer service web pages. Features of customer service include, but are not limited to, generating a report on consumer e-mails, viewing all relevant e-mails; answering all relevant e-mails; tagging e-mails with identifying codes; and customizing text copies. Other features may exist.

Pages 32-34 of Exhibit 1 describes a set of administration web pages. These web pages permit an operator to access one or more parts of the website depending upon pre-determined authorization. Features of administration include, but are not limited to, operator profile and reports; create/edit digital right management license page/questionnaire; create/edit incentive entry page/questionnaire; create/edit mass e-mail template; create/edit hosted page; create/edit B2B submission page; create/edit problem message page; create/edit player skins; manage corporate site; edit territorial restrictions parameters and groups; edit bandwidth restriction parameters; edit volume limit parameters; edit genres; edit/delete archived data from reporting system; edit navigation tips section; and edit "my" user name and access code. Other features may exist.

On Page 35 of Exhibit 1, a logoff web page is described.

Appendices 1 through 3 on Pages 35-40 illustrate various pre-determined authorizations for operators, development staging of an exemplary platform, and a description of an exemplary file format that can be used with the invention.

Pages 40-45 illustrate a series of system diagrams corresponding with the web pages described on Pages 1-39.

Note that the system and method described in Exhibit 1 permits unique usage parameters to be set such as (i) territorial restrictions, (ii) system bandwidth capacity, (iii) specific Outlet ID and the User Interface elements pertaining to each outlet, and (iv) DRM usage rules depending on the file delivered and the outlet it is Delivered to.

Exhibit 2 is a description of an exemplary platform architecture in accordance with the invention described in Exhibit 1. In this exhibit, a "project-centric" architecture is described with the various associations that can be made with a particular project. Various rules and a hierarchy for the platform architecture are further described in Exhibit 2.

For example, the distribution of digital assets by the system is made on a "project-centric" basis. A hierarchy for the system disclosed is tailored for a "project-centric" approach such as the following: A "project" is a folder comprised of several, or multiple "digital works" or digital assets. Each digital work or digital asset may include its own digital rights management (DRM) application, its own unique usage rules, and its own user interface elements. These differences between various digital works or digital assets vary according to file format, the nature of the content, and the desire of the content owner. Regardless of such differences between digital works or digital assets, all digital works or digital assets within a "project" can be delivered to the "outlet" as a part of a particular "project." This can be accomplished by listing all digital works or digital assets relating to a particular "project" on the same subject line on the so-called "submission form." The system utilizes various submission forms such as dedicated mini-sites customizable for each outlet. The system can also utilize XML, and other methods; but a "project-centric" feature for all these methods can be accomplished. The outlet can then choose which digital works or digital assets related to each project will be delivered to its consumers. It may then be the case that all such digital works or digital assets, or a selection of digital works or digital assets, or only one digital work or digital asset are used by the outlet. The Outlet further controls how such digital works or digital assets will be grouped, sorted and displayed to its consumers.

By way of further example, a "project" can be any of the following: an Artist theme, an Album theme, a Label theme, an Outlet theme, a Genre theme, or any other theme based on a thematic category such as a holiday, a sport, etc. Furthermore, the association of multiple digital works or digital assets with one unique "project" can also be accomplished by associating multiple themes together. These and other examples are illustrated in the accompanying Exhibits 1-4.

Exhibit 3 is a description of another system and method in accordance with another embodiment of the invention. Pages 3-6 of Exhibit 3 illustrate and describe various modules in a hardware infrastructure configuration for this embodiment of the invention.

Exhibit 4 is a description of a method according to an exemplary embodiment of the invention.

While the above description contains many specifics, these specifics should not be construed as limitations on the scope of the invention, but merely as exemplifications of the disclosed embodiments. Those skilled in the art will envision many other possible variations that fall within the scope and spirit of the invention.

What is claimed is:

1. A method for providing digital assets of one or more content owners to a computer system of one or more merchant outlets for further distribution to computer systems of consumers associated with said merchant outlets, comprising the steps of:
    a) creating a data base of media assets in a plurality of formats;
    b) organizing said data base by project, each said project associated with media assets in said data base relating to a selected attribute of said asset other than the format of the asset;
    c) subject to preset parameters set by the content owner and responsive to communication from the computer system of at least one said merchant outlet to the computer system of the content owner relating to media formats, pricing and other product provisions acceptable to said communicating merchant outlet, creating an outlet data base including such acceptable media formats, pricing and other product provisions for said communicating merchant outlet;
    d) responsive to parameters controlled by said communicating merchant outlet including acceptable media formats, pricing and other product provisions, and responsive to a communication by the computer system of a consumer of said merchant outlet requesting media assets of a selected project, transmitting said media assets to said merchant outlet in formats acceptable to both the content owner and the merchant outlet; and
    e) transmitting the media assets of said selected project to the computer system of said consumer in a format acceptable to the consumer selected from the media assets selected in step d).

2. The method of claim 1 wherein said media formats are selected from formats pre-approved by the content owner and selected by a merchant outlet.

3. The method of claim 1 wherein the pricing provision is the price to the merchant outlet of a folder including a media asset.

4. The method of claim 1 wherein the pricing provision is the price to the merchant outlet of a media asset coupled with other media asset(s).

5. The method of claim 1 wherein the pricing provision is the price by communications between the computer system of the content owner and the computer system of the merchant outlet.

6. The method of claim 1 wherein the pricing provision is a commission payable to the merchant outlet by the content owner.

7. The method of claim 1 wherein the pricing provision is a price discount to the merchant outlet from the content owner.

* * * * *